United States Patent
Igeta et al.

(10) Patent No.: US 8,237,906 B2
(45) Date of Patent: Aug. 7, 2012

(54) LIQUID CRYSTAL DISPLAY DEVICE

(75) Inventors: Koichi Igeta, Chiba (JP); Osamu Nagashima, Mobara (JP)

(73) Assignees: Hitachi Displays, Ltd., Chiba (JP); Panasonic Liquid Crystal Display Co., Ltd., Hyogo-ken (JP)

(*) Notice: Subject to any disclaimer, the term of this patent is extended or adjusted under 35 U.S.C. 154(b) by 329 days.

(21) Appl. No.: 12/555,863

(22) Filed: Sep. 9, 2009

(65) Prior Publication Data

US 2010/0060842 A1   Mar. 11, 2010

(30) Foreign Application Priority Data

Sep. 10, 2008   (JP) ................. 2008-232082

(51) Int. Cl.
*G02F 1/1339* (2006.01)

(52) U.S. Cl. ........................... 349/153; 349/155

(58) Field of Classification Search .......... 349/155, 349/142, 94, 153

See application file for complete search history.

(56) References Cited

U.S. PATENT DOCUMENTS

| | | | |
|---|---|---|---|
| 7,391,493 B2* | 6/2008 | Kim ............... | 349/155 |
| 2006/0262267 A1 | 11/2006 | Sekiguchi | |
| 2008/0129916 A1* | 6/2008 | Ota et al. ........... | 349/58 |

FOREIGN PATENT DOCUMENTS

| | | |
|---|---|---|
| JP | 2005-046352 | 2/2005 |
| JP | 2006-323141 | 11/2006 |

OTHER PUBLICATIONS

Machine translation of JP2005-046352A; Feb. 24, 2005.*

* cited by examiner

*Primary Examiner* — Wen-Ying P Chen
(74) *Attorney, Agent, or Firm* — Antonelli, Terry, Stout & Kraus, LLP.

(57) ABSTRACT

A liquid crystal display device includes: a pair of substrates disposed to face each other; an inner sealing material surrounding a non-display region between the pair of substrates; an outer sealing material surrounding the inner sealing material; liquid crystal filled between the inner sealing material and the outer sealing material; and a display region formed in a region where the liquid crystal is filled, and first columnar spacers fixed on any one of the pair of substrates are formed in the forming region of the inner sealing material, the first columnar spacers being formed so as to avoid positions overlapped with intersecting portions of the gate signal lines and the drain signal lines.

9 Claims, 8 Drawing Sheets

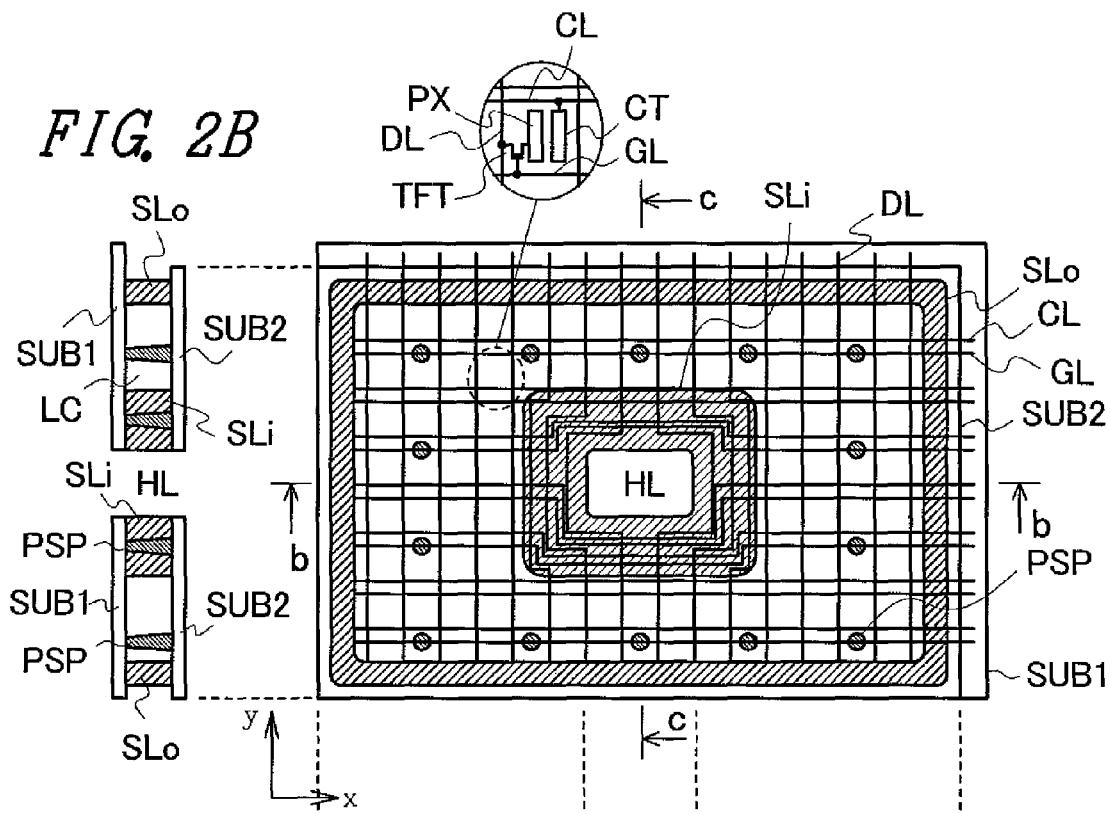
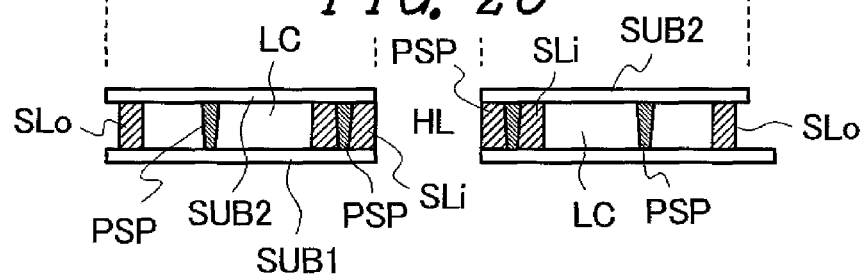

LIQUID CRYSTAL DISPLAY DEVICE

The present application claims priority from Japanese application JP2008-232082 filed on Sep. 10, 2008, the content of which is hereby incorporated by reference into this application.

BACKGROUND OF THE INVENTION

1. Field of the Invention

The present invention relates to a liquid crystal display device and more particularly to an active matrix type liquid crystal display device having a non-display region such as, for example, an opening in a part of the display region thereof.

2. Background Art

Active matrix type liquid crystal display devices include at least a thin film transistor which is turned on by a scanning signal from a gate signal line and a pixel electrode which is supplied with a video signal from a drain signal line through the turned-on thin film transistor in each of pixel regions surrounded by, for example, a plurality of gate signal lines extending in the x-direction and arranged in parallel in the y-direction and a plurality of drain signal lines extending in the y-direction and arranged in parallel in the x-direction on a surface on the liquid crystal side of one of a pair of substrates which are disposed to face each other with liquid crystal interposed therebetween.

One of the substrates is fixed to the other substrate with a sealing material which is formed so as to surround a display region composed of the assembly of the pixel regions and functions to seal the liquid crystal therein. Spacers are generally interposed in a scattered manner in the display region and the forming region of the sealing material between the substrates in order to uniform the layer thickness of the liquid crystal.

Among such liquid crystal display devices, a liquid crystal display device applied, for example, to amusement equipment has been known in which an opening (non-display region) formed of a through hole is formed in a part of the display region in each of the substrates. Such a liquid crystal display device is disclosed in, for example, JP-A-2005-46352.

In this case, although not described in detail in JP-A-2005-46352, the opening is formed in a liquid crystal display region, and therefore a new sealing material (this sealing material is referred to as inner sealing material, whereas the conventional sealing material formed on the outer circumference of the substrates is sometimes referred to as outer sealing material) has to be formed so as to surround the opening between the substrates to seal liquid crystal therein.

JP-A-2006-323141 is another patent document relating to the invention although it does not include the inner sealing material. JP-A-2006-323141 discloses a technique of arranging spacers referred to as so-called columnar spacers in the forming region of the outer sealing material and describes that the columnar spacers function as a base for placing a mask in forming an alignment film by vapor deposition.

SUMMARY OF THE INVENTION

In the configuration including the inner sealing material and the outer sealing material, when spacers are interposed between the substrates also in the forming region of the inner sealing material in the same manner as in the forming region of the outer sealing material, it has been found that a disadvantage shown below occurs. Here, the sealing materials (outer sealing material and inner sealing material) are formed by, for example, screen printing, a dispenser method, or an ink jet method. The glass fibers or beads are mixed in the sealing materials to function as the spacers because of easiness in operation.

FIGS. 9A to 9C and 10A to 10C are explanatory views showing the reason of the disadvantage in such a liquid crystal display device. FIGS. 9A to 9C and 10A to 10C respectively correspond to FIGS. 2A to 2C and 4A and 4B showing the configuration of an embodiment of the invention. Therefore, only a disadvantageous point in the configuration shown in FIGS. 9A to 9C and 10A to 10C will be described below. Please refer to the descriptions about FIGS. 2A to 2C and 4A and 4B for the detailed configuration of the periphery.

In FIGS. 9A to 9C, an opening HL is formed through substrates SUB1 and SUB2 interposing liquid crystal therebetween, an inner sealing material SLi is formed so as to surround the opening HL in the vicinity of the opening HL, and an outer sealing material SLo is formed so as to surround the inner sealing material SLi and a display region AR outside the inner sealing material SLi. Gate signal lines GL, common signal lines CL, and drain signal lines DL are formed on a surface of the substrate SUB1 on the liquid crystal side. Among the signal lines, the signal lines which are to be arranged so as to cross the opening HL when they are virtually extended as they are are formed into patterns which bypass the opening HL. The bypassing patterns of the signal lines are arranged in the forming region of the inner sealing material SLi around the opening HL as much as possible. The reason is to ensure an area of a region functioning as the display region AR as large as possible.

In this case, when glass fibers GF, for example, are mixed in the inner sealing material SLi (glass fibers or the like mixed in the outer sealing material SLo are not shown in the drawing), the glass fibers GF may be arranged at, for example, the intersecting portions of the gate signal lines GL and the drain signal lines DL because the positions of the glass fibers GF are not constant in the inner sealing material SLi. FIG. 10A is an enlarged view showing an arrangement state of the gate signal lines GL and the drain signal lines DL arranged in the inner sealing material SLi, showing the presence of the glass fibers GF arranged at the intersecting portions of the gate signal lines GL and the drain signal lines DL. In this case, as shown in FIG. 10B which is a cross sectional view taken along line b, c-b, c in FIG. 10A, interlayer insulation is created between the drain signal line DL and the gate signal line GL via an insulating film GI. However, as shown in FIG. 10C which is also a cross sectional view taken along line b, c-b, c in FIG. 10A, when a pressure P is applied on the substrate SUB2 toward the substrate SUB1 side, the pressure P breaks the insulating film GI through the glass fiber GF. As a result, there arises a disadvantage that an electrical short occurs between the drain signal line DL and the gate signal line GL.

It is an object of the invention to provide a liquid crystal display device capable of avoiding an electrical short at wiring intersecting portions in the forming region of an inner sealing material.

In the liquid crystal display device according to the invention, spacers to be scattered in the forming region of the inner sealing material can be formed at predetermined positions so that a force is prevented from acting on the wiring intersecting portions through the spacers.

The invention can be configured as below, for example.

(1) A liquid crystal display device of the invention includes: a pair of substrates disposed to face each other; an inner sealing material surrounding a non-display region between the pair of substrates; an outer sealing material surrounding the inner sealing material; liquid crystal filled between the inner sealing material and the outer sealing material; and a display region formed in a region where the liquid crystal is filled, wherein at least a plurality of gate signal lines extending in a first direction and arranged in parallel and a plurality of drain signal lines extending in a second direction and arranged in parallel are formed on a surface of one of the pair of substrates on a liquid crystal side, among the plurality of gate signal lines and the plurality of drain signal lines, the gate signal lines and the drain signal lines which are to be arranged so as to cross the non-display region when they are virtually extended as they are formed into patterns which bypass the non-display region and partially formed in the forming region of the inner sealing material, and first columnar spacers fixed on any one of the pair of substrates are formed in the forming region of the inner sealing material, the first columnar spacers being formed so as to avoid positions overlapped with intersecting portions of the gate signal lines and the drain signal lines.

(2) The liquid crystal display device of the invention has a feature in that, in (1), the first columnar spacers formed in the forming region of the inner sealing material include those which are formed in a region where the gate signal line and the drain signal line are not formed and those which are formed above the gate signal line or the drain signal line, and the diameters of the first columnar spacers formed in the region where the gate signal line and the drain signal line are not formed are greater than those of the first columnar spacers formed above the gate signal line or the drain signal line.

(3) The liquid crystal display device of the invention has a feature in that, in (1), second columnar spacers fixed on any one of the pair of substrates are formed in the display region.

(4) The liquid crystal display device of the invention has a feature in that, in (3), the heights of the first columnar spacers formed in the forming region of the inner sealing material are greater than those of the second columnar spacers formed in the display region.

(5) The liquid crystal display device of the invention has a feature in that, in (3), third columnar spacers fixed on any one of the pair substrates are formed in the forming region of the outer sealing material.

(6) The liquid crystal display device of the invention has a feature in that, in (5), the heights of the third columnar spacers formed in the forming region of the outer sealing material are greater than those of the second columnar spacers formed in the display region.

(7) The liquid crystal display device of the invention has a feature in that, in (3), glass fibers or beads are mixed in the outer sealing material.

(8) The liquid crystal display device of the invention has a feature in that, in (7), the diameters of the glass fibers or the beads mixed in the outer sealing material are greater than the heights of the second columnar spacers formed in the display region.

(9) The liquid crystal display device of the invention has a feature in that, in (1), common signal lines or capacitor signal lines are each formed between a pair of the gate signal lines adjacent to each other along the gate signal line, among the common signal lines or the capacitor signal lines, the common signal lines or the capacitor signal lines which are to be arranged so as to cross the non-display region when they are virtually extended as they are formed into patterns which bypass the non-display region and partially formed in the forming region of the inner sealing material, and the first columnar spacers are formed so as to avoid positions overlapped with intersecting portions of the common signal lines or the capacitor signal lines and the drain signal lines.

(10) The liquid crystal display device of the invention has a feature in that, in (9), the first columnar spacers formed in the forming region of the inner sealing material include those which are formed in a region where the gate signal line, the drain signal line, and the common signal line or the capacitor signal line are not formed and those which are formed above the gate signal line, the drain signal line, and the common signal line or the capacitor signal line, and the diameters of the first columnar spacers formed in the region where the gate signal line, the drain signal line, and the common signal line or the capacitor signal line are not formed are greater than those of the first columnar spacers formed above the gate signal line, the drain signal line, and the common signal line or the capacitor signal line.

The above configurations are given by way of examples only. The invention can be modified appropriately within a range not departing from the technical idea thereof. Exemplary configurations of the invention other than the above configurations will be apparent from the entire description and drawings of the specification.

According to the liquid crystal display device of the invention, an electrical short at wiring intersecting portions can be avoided in the forming regions of an inner sealing material.

Other advantages of the invention will be apparent from the entire description of the specification.

BRIEF DESCRIPTION OF THE DRAWINGS

FIGS. 2A to 2C are configuration views schematically showing the liquid crystal display device according to the first embodiment of the invention;

DESCRIPTION OF THE PREFERRED EMBODIMENT

Figure 1:
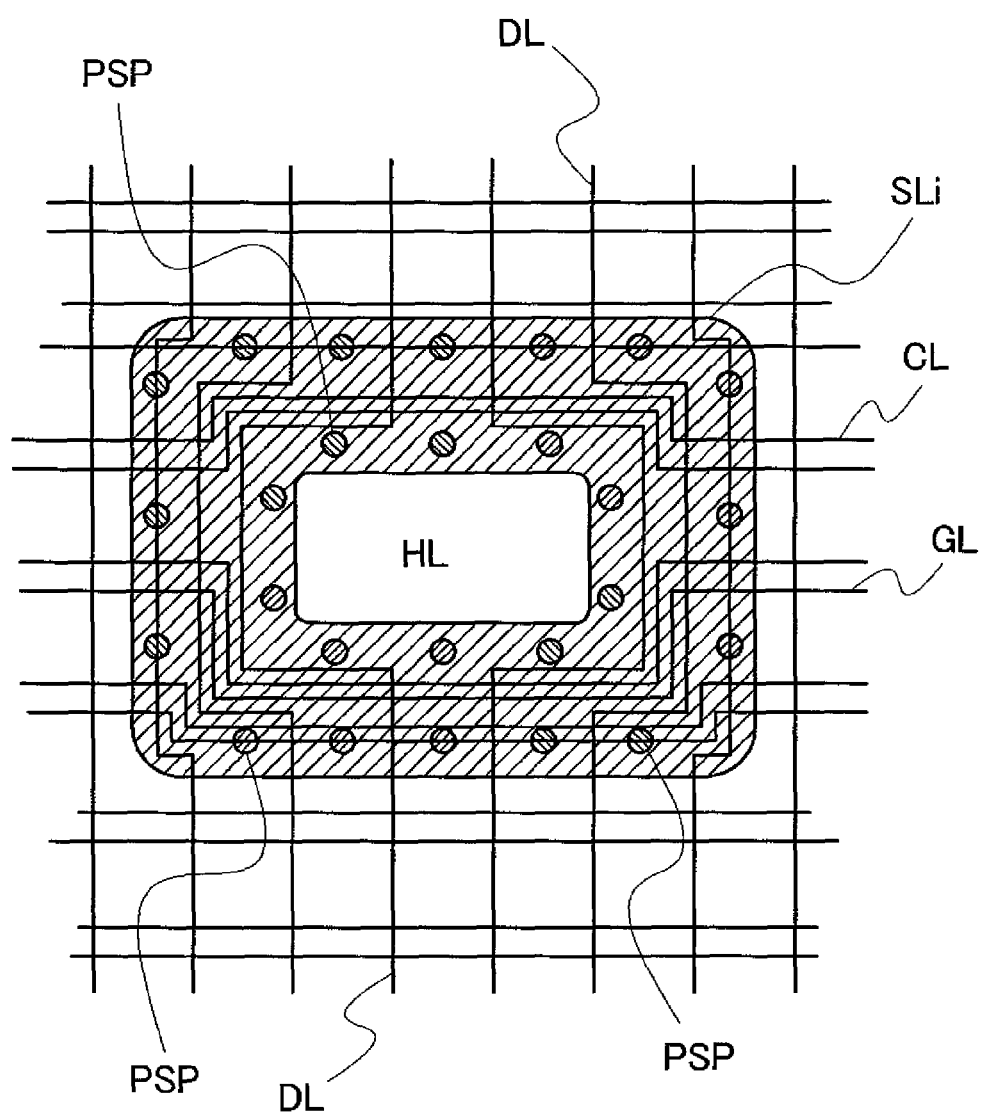
FIG. 1 is a plan view showing a main part of a liquid crystal display device according to a first embodiment of the invention.

Embodiments of the invention will be described with reference to the drawings. In the drawings and embodiments, the same or similar constituent elements are denoted by the same reference numerals and signs, and the description thereof is omitted.

First Embodiment

Overall Configuration

FIG. 2A is a plan view schematically showing a liquid crystal display device. FIG. 2B is a cross sectional view taken along line b-b in FIG. 2A. FIG. 2C is a cross sectional view taken along line c-c in FIG. 2A.

The liquid crystal display device includes substrates SUB1 and SUB2 arranged so as to interpose liquid crystal LC therebetween as an envelope. In each of the substrates SUB1 and SUB2, an opening HL having a relatively large area is formed at, for example, the center thereof. The substrate SUB2 is fixed to the substrate SUB1 with an outer sealing material SLo annularly formed in the vicinity of the outer circumferential of the substrates and an inner sealing material SLi annularly formed in the vicinity of the opening HL. The liquid crystal LC is filled in a region inside the outer sealing material SLo and outside the inner sealing material SLi. The region filled with the liquid crystal constitutes a display region AR.

In FIG. 2A, gate signal lines GL extending in the x-direction and arranged in parallel in the y-direction, drain signal lines DL extending in the y-direction and arranged in parallel in the x-direction, and common signal lines CL arranged in parallel each between the gate signal lines GL adjacent to each other are formed on a surface of the substrate SUB1 on a liquid crystal LC side. The gate signal lines GL, the drain signal lines DL, and the common signal lines CL are supplied with signals respectively corresponding thereto from one end side thereof. The gate signal lines GL and the common signal lines CL are formed in, for example, the same layer on the substrate SUB1. The drain signal lines DL are formed above an insulating film GI (refer to FIGS. 3B and 3C) which is formed on the substrate SUB1 so as to cover the gate signal lines GL and the common signal lines CL.

In this case, the gate signal lines GL which are to be arranged so as to cross a non-display region (the opening HL and its periphery region) when they are virtually extended as they are, among the gate signal lines GL, are formed into patterns which bypass around the opening HL. More specifically, the gate signal lines GL which are to be arranged so as to cross the upper side of the opening HL in the drawing and its peripheral region are formed into a pattern which bypasses around the upper side of the opening HL in the drawing. The gate signal lines GL which are to be arranged so as to cross the lower side of the opening HL in the drawing and its peripheral region are formed into a pattern which bypasses around the lower side of the opening HL in the drawing. Also in the case of the common signal lines CL, similar to the gate signal lines GL, the common signal lines CL which are to be arranged so as to cross the upper side of the opening HL in the drawing and its peripheral region are formed into a pattern which bypasses around the upper side of the opening HL in the drawing. The common signal lines CL which are to be arranged so as to cross the lower side of the opening HL in the drawing and its peripheral region are formed into a pattern which bypasses around the lower side of the opening HL in the drawing. Similarly, also in the case of the drain signal lines DL, the drain signal lines DL which are to be arranged so as to cross the left side of the opening HL in the drawing and its peripheral region are formed into a pattern which bypasses around the left side of the opening HL in the drawing. The drain signal lines DL which are to be arranged so as to cross the right side of the opening HL in the drawing and its peripheral region are formed into a pattern which bypasses around the right side of the opening HL in the drawing.

The bypassing patterns of the gate signal lines GL, the common signal lines CL, and the drain signal lines DL around the opening HL are arranged so as to be contained in the forming region of the inner sealing material SLi as much as possible. The reason is to ensure an area of the region functioning as the display region AR as large as possible. Therefore, the bypassing patterns of the respective signal lines may be slightly protruded in the region outside the inner sealing material SLi. In the forming region of the inner sealing material SLi, intersecting portions of the gate signal lines GL and the drain signal lines DL (hereinafter also referred to as wiring intersecting portions), and intersecting portions of the common signal lines CL and the drain signal lines DL (hereinafter also referred to as wiring intersecting portions) are inevitably formed. In addition, the intersecting portions are arranged at a higher density than that of intersecting portions of the display region AR.

In the forming regions of the display region AR and the inner sealing material SLi, columnar spacers PSP fixed on, for example, a surface of the substrate SUB2 on the liquid crystal side are formed in a scattered manner. In this case, the columnar spacers PSP in the display region AR are arranged so as to overlap above the gate signal lines GL, for example. This is in order to avoid a reduction in aperture ratio caused by arranging the columnar spacers in a substantial pixel region. The columnar spacers PSP in the forming region of the inner sealing material SLi (not shown in FIG. 2A; refer to FIGS. 2B and 2C) are arranged so as not to overlap the wiring intersecting portions. The columnar spacers PSP in the forming region of the inner sealing material SLi will be described in detail later. In the embodiment, for example, glass fibers (not shown) mixed in the outer sealing material SLo are used as spacers in the forming region of the outer sealing material SLo. The sealing material is formed by, for example, screen printing, a dispenser method, or an ink jet method. The operation can be facilitated by mixing glass fibers or the like in the sealing material.

A region surrounded by a pair of the gate signal lines GL adjacent to each other and a pair of the drain signal lines DL adjacent to each other form a pixel region (region within the dotted circle). In the pixel region, a thin film transistor TFT, a pixel electrode PX, and a counter electrode CT are provided as shown in an equivalent circuit in an enlarged view A. The thin film transistor TFT is turned on with a signal (scanning signal) from the gate signal line GL. The pixel electrode PX is supplied with a signal (video signal) from the drain signal line DL through the turned-on thin film transistor TFT. The counter electrode CT is supplied with a signal which serves as a reference signal for the video signal through the common signal line CL.

The thus configured pixel generates an electric field having a component parallel to the substrate SUB1 between the pixel electrode PX and the counter electrode CT to drive liquid crystal. The system which drives liquid crystal by the electric field having the component parallel to the substrate SUB1 as described above is referred to as horizontal electric field system or In-Plane Switching (IPS) system.

(Pixel Configuration)

Figure 3A:
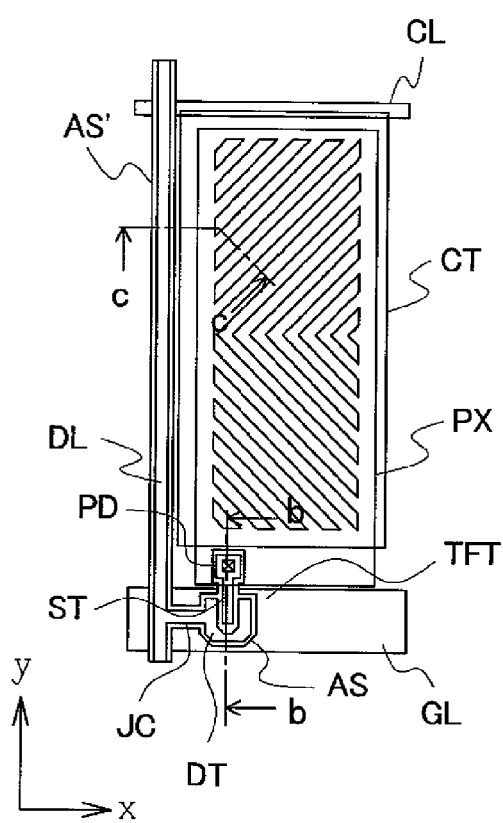
FIGS. 3A to 3C show the configuration of a pixel of the liquid crystal display device according to the first embodiment of the invention.

FIG. 3A is a plan view showing an example of one pixel among the pixels arranged in a matrix on the substrate SUB1 side of the liquid crystal display device.

Figure 3B:
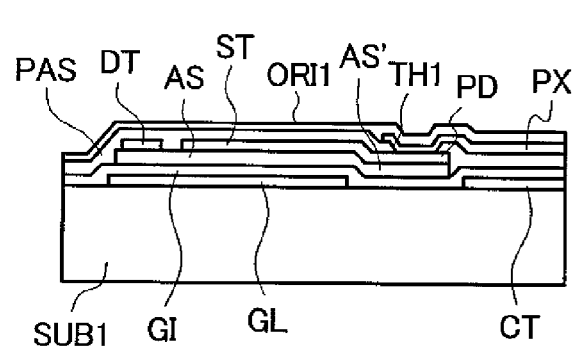
Figure 3C:
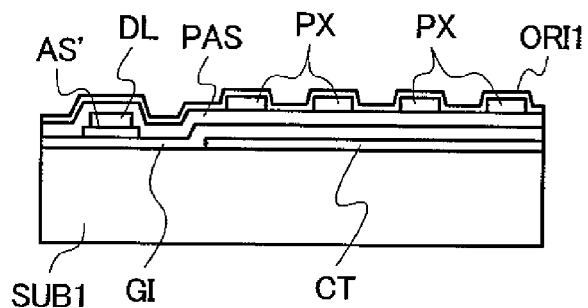

FIGS. 3B and 3C are a cross sectional view taken along line b-b in FIG. 3A and a cross sectional view taken along line c-c in FIG. 3A, respectively.

First, on the surface of the substrate SUB1 on the liquid crystal side, the gate signal line GL and the common signal line CL are formed in parallel with each other with a relatively large distance therebetween.

The counter electrode CT formed of, for example, a transparent conductive material of Indium-Tin-Oxide (ITO) is formed in a region between the gate signal lines GL and the common signal lines CL. The counter electrode CT is overlapped with the common signal line CL at a side thereof on the common signal lines CL side, thereby being electrically connected to the common signal line CL.

The insulating film GI is formed on the surface of the substrate SUB1 so as to cover the gate signal line GL, the common signal line CL, and the counter electrode CT. The insulating film GI functions as an insulating film of a thin film transistor TFT (described later) in the forming region of the thin film transistor TFT, so that the thickness or the like thereof is set corresponding thereto.

An amorphous semiconductor layer AS made of, for example, amorphous silicon is formed on the upper surface of the insulating film GI at a position overlapped with part of the gate signal line GL. The semiconductor layer AS serves as a semiconductor layer of the thin film transistor TFT.

The semiconductor layer AS is also formed under, for example, the drain signal line DL, a connection JC electrically connecting the drain signal line DL with a drain electrode DT of the thin film transistor TFT, and a portion (including a pad PD) of a source electrode ST of the thin film transistor TFT extending over the forming region of the thin film transistor TFT in addition to the forming region of the thin film transistor TFT as indicated by reference sign AS'. The semiconductor layer AS can be formed under, for example, the drain signal line DL with a slight difference in level.

The drain signal line DL is formed so as to extend in the y-direction in the drawing. The drain signal line DL includes an extending portion which extends toward the thin film transistor TFT side at a part thereof. The extending portion (the connection JC) is connected to the drain electrode DT of the thin film transistor TFT formed on the semiconductor layer AS.

The source electrode ST formed at the same time of forming the drain signal lines DL and the drain electrode DT faces the drain electrode DT on the semiconductor layer AS and includes an extending portion which is slightly extended from above the semiconductor layer AS toward the pixel region side. The extending portion is extended to the pad PD connected to the pixel electrode PX (described later).

The drain electrode DT is formed into, for example, a U-shaped pattern formed so as to surround a top end of the source electrode ST. This can allow a channel width of the thin film transistor TFT to be formed large.

When the semiconductor layer AS is formed on the insulating film GI, the semiconductor layer AS is doped with an impurity at a high concentration at the surface thereof. For example, after the drain electrode DT and the source electrode ST are formed by patterning, the impurity layer at a high concentration formed in a region other than the forming regions of the drain electrode DT and the source electrode ST is etched using a photoresist film on the drain electrode DT and the source electrode ST as a mask. This is in order to leave the impurity layer at a high concentration between the semiconductor layer AS, and the drain electrode DT and the source electrode ST, thereby forming the impurity layer as an ohmic contact layer.

With this configuration, the thin film transistor TFT is formed as a so-called inverted staggered transistor of Metal-Insulator-Semiconductor (MIS) structure with the gate signal lines GL as a gate electrode.

A protective film PAS formed of an insulating film is formed on the surface of the substrate SUB1 so as to cover the thin film transistor TFT. The protective film PAS is provided to avoid the direct contact between the thin film transistor TFT and the liquid crystal. The protective film PAS is also interposed between the counter electrode CT and the pixel electrode PX (described later) so that the protective film PAS also functions together with the insulating film GI as a dielectric film of a capacitor element provided between the counter electrode CT and the pixel electrode PX.

The pixel electrode PX is formed on the upper surface of the protective film PAS. The pixel electrode PX is formed of, for example, a transparent conductive film such as of Indium-Tin-Oxide (ITO) and formed so as to overlap the counter electrode CT in a large area.

In the pixel electrode PX, numerous slits are formed in parallel in a direction intersecting the longitudinal direction of the slit. Therefore, the pixel electrode PX has an electrode group including numerous linear electrodes which are connected with one another at both ends thereof.

As shown in FIG. 3A, the electrodes of the pixel electrode PX are formed so as to extend in, for example, a direction at +45° with respect to the running direction of the gate signal lines GL in one of regions which are obtained by dividing the pixel region into, for example, upper and lower two regions in the drawing and formed so as to extend in a direction at −45° in the other region. This configuration employs a so-called multi domain scheme, which eliminates a disadvantage that coloring occurs depending on the direction of view when the directions of slits provided in the pixel electrode PX in one pixel are the same (direction of the electrode group of the pixel electrode PX).

The thus formed pixel electrode PX is electrically connected to the pad PD of the source electrode ST of the thin film transistor TFT through a through hole TH1 formed through the protective film PAS at a side thereof on the thin film transistor TFT side. An alignment film ORI1 is formed on the surface of the substrate SUB1 so as to cover the pixel electrode PX.

(Columnar Spacers in Forming Region of Inner Sealing Material)

FIG. 1 is an enlarged view showing the inner sealing material SLi and its vicinity shown in FIG. 2 together with the columnar spacers PSP formed in the forming region of the inner sealing material SLi.

As described above, the gate signal lines GL, the drain signal lines DL, and the common signal lines CL which are to cross the non-display region (the opening HL and its periphery) when they are virtually extended as they are formed into the patterns which bypass around the opening HL, and the bypassing patterns are partially formed in the forming region of the inner sealing material SLi. Therefore, in the forming region of the inner sealing material SLi, the wiring intersecting portions of the gate signal lines GL and the drain signal lines DL, and the wiring intersecting portions of the common signal lines CL and the drain signal lines DL are inevitably formed.

On the other hand, the columnar spacers PSP are arranged in a scattered manner in the forming region of the inner sealing material SLi. The columnar spacers PSP are formed in regions where signal lines (the gate signal lines GL, the common signal lines CL, and the drain signal lines DL) are not formed or above single running signal lines (any of the gate signal lines GL, the common signal lines CL, and the drain signal lines DL). Therefore, the columnar spacers PSP are substantially uniformly distributed in the forming region of the inner sealing material SLi. From this fact, the columnar spacers PSP are not arranged so as to overlap the wiring intersecting portions. All of the columnar spacers PSP may be formed in the regions where the signal lines are not formed. As described above, however, the wiring intersecting portions in the forming region of the inner sealing material SLi are arranged at a higher density than that of the wiring intersecting portions in the display region AR. Therefore, the columnar spacers PSP are formed also above single running signal lines, whereby the number of the columnar spacers PSP arranged in the forming region of the inner sealing material SLi is increased.

The columnar spacers PSP are formed by, for example, selectively etching a resin material layer formed on the substrate SUB2 side by a photolithography technique. Therefore, the columnar spacers PSP can be formed at predetermined positions with high precision and are not changed in position later on. Accordingly, the columnar spacers PSP can be formed easily and reliably so as to avoid positions overlapped with the wiring intersecting portions. In this case, for example, even when a pressure is applied on the substrate SUB2 toward the substrate SUB1 side, no force is applied to the wiring intersecting portions. As a result, an electrical short between the signal lines at the wiring intersecting portions can be prevented.

Figure 4A:
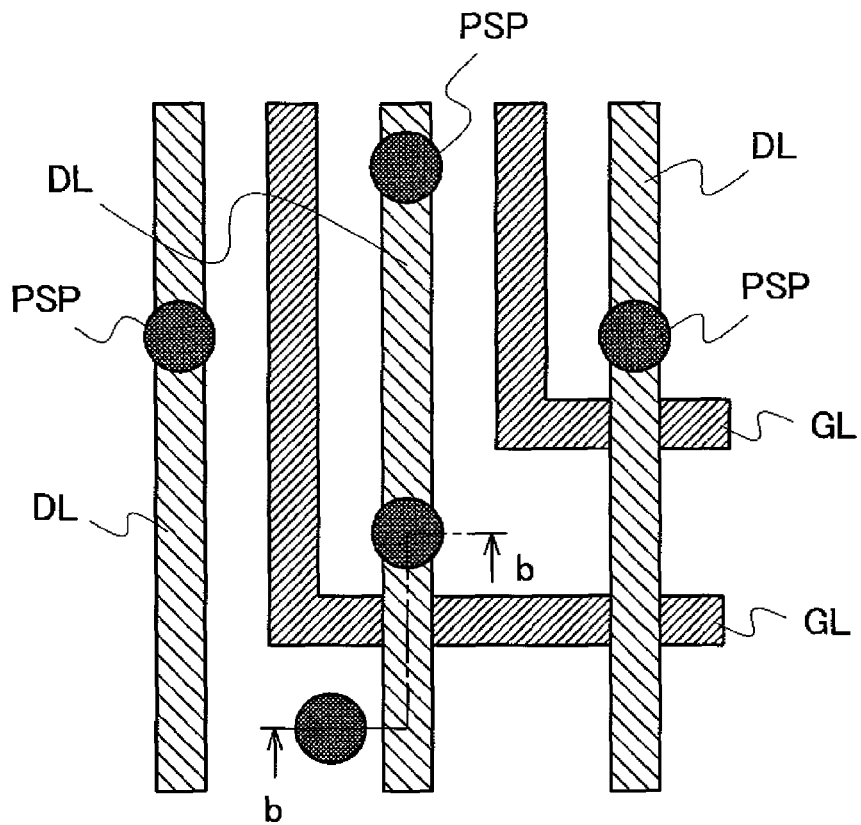
FIGS. 4A and 4B show an advantage of the liquid crystal display device according to the first embodiment of the invention.

FIG. 4A is an enlarged plan view showing the columnar spacers PSP formed in the region where the gate signal lines GL, the common signal lines CL, and the drain signal lines DL are not formed and above single running signal lines in the forming region of the inner sealing material SLi where the signal lines are formed. As described above, the spacers are not formed above the wiring intersecting portions.

Figure 4B:
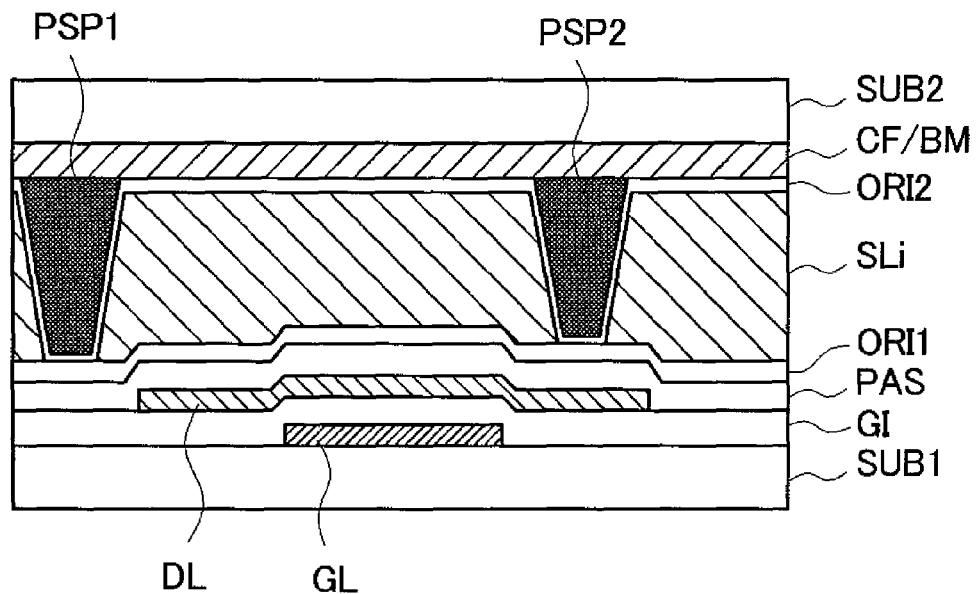

FIG. 4B is a cross sectional view corresponding to line b-b in FIG. 4A. In FIG. 4B, the columnar spacer PSP (indicated by reference sign PSP1 in the drawing) formed in the region where the signal lines (the gate signal lines GL, the drain signal lines DL, and the common signal lines CL) are not formed and the columnar spacer PSP (indicated by reference sign PSP2) formed above a single running signal line (for example, the drain signal line DL) are shown. In this case, there is a difference in level corresponding to the thickness of a signal line between the region where the signal line is not formed and the region where the signal line is formed. The respective columnar spacers PSP1 and PSP2 which are fixedly formed on the substrate SUB2 side has to be set to appropriate heights so that the tops of the columnar spacers appropriately abut on the substrate SUB1 side. In this case, the respective spacers are formed to have different diameters and baked, whereby they can be set to heights corresponding to the respective diameters. That is, a small diameter can form a short spacer, while a large diameter can form a tall spacer. In this case, it is preferable that the diameter of the columnar spacer PSP1 be made larger than that of the columnar spacer PSP2 to make the height of the columnar spacer PSP1 higher than that of the columnar spacer PSP2.

In FIG. 4B, the columnar spacers PSP1 and PSP2 are formed on a substantially flat surface of a color filter CF covering a black matrix BM on the surface of the substrate SUB2 on the liquid crystal side. Therefore, respective heights of the columnar spacers PSP1 and PSP2 depend on a layer structure of the surface of the substrate SUB1, which the tops of the columnar spacers abut, on the liquid crystal side. Reference sign ORI2 in the drawing denotes an alignment film.

(Spacers in Display Region)

Figure 5:
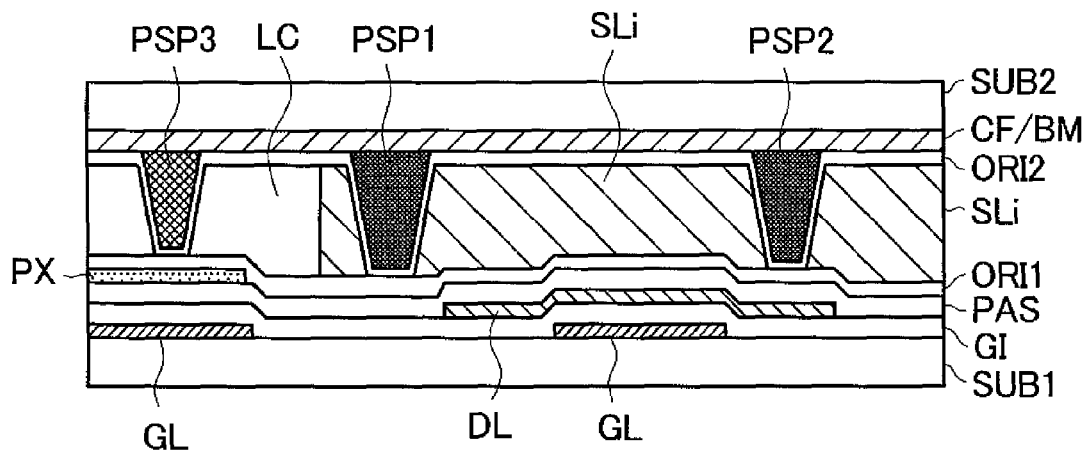
FIG. 5 is a cross sectional view showing spacers formed in a display part of the liquid crystal display device according to the first embodiment of the invention.

FIG. 5 is a cross sectional view showing the columnar spacers PSP (indicated by the reference signs PSP1 and PSP2 in the drawing) formed in the forming region of the inner sealing material SLi and the columnar spacer PSP (indicated by reference sign PSP3 in the drawing) formed in the display region AR in the vicinity of the inner sealing material SLi. In FIG. 5, the configuration in the forming region of the inner sealing material SLi is the same as that shown in FIG. 4B.

As shown in FIG. 5, the columnar spacer PSP3 formed in the display region AR is fixed on the substrate SUB2 side in the same manner as the columnar spacers PSP1 and PSP2 formed in the forming region of the inner sealing material SLi. Therefore, the columnar spacers PSP1, PSP2, and PSP3 are concurrently formed. In this case, on the surface of the substrate SUB1 on the liquid crystal side, a layer structure in the display region AR is generally different from that in the forming region of the inner sealing material SLi. Therefore, the columnar spacer PSP3 formed in the display region AR has to be formed to have a different height from the columnar spacers PSP1 and PSP2 formed in the forming region of the inner sealing material SLi. As shown in FIG. 5, for example, when the columnar spacer PSP3 formed in the display region AR has to be formed shorter than the columnar spacers PSP1 and PSP2 in the forming region of the inner sealing material SLi, the diameter of the columnar spacer PSP3 is formed smaller than those of the columnar spacers PSP1 and PSP2. Therefore, the top of the columnar spacer PSP3 can appropriately abut the surface on the substrate SUB1 side. This is because, as described above, the columnar spacers can be set by baking to a height corresponding to the diameter after formation.

Second Embodiment

Figure 6:
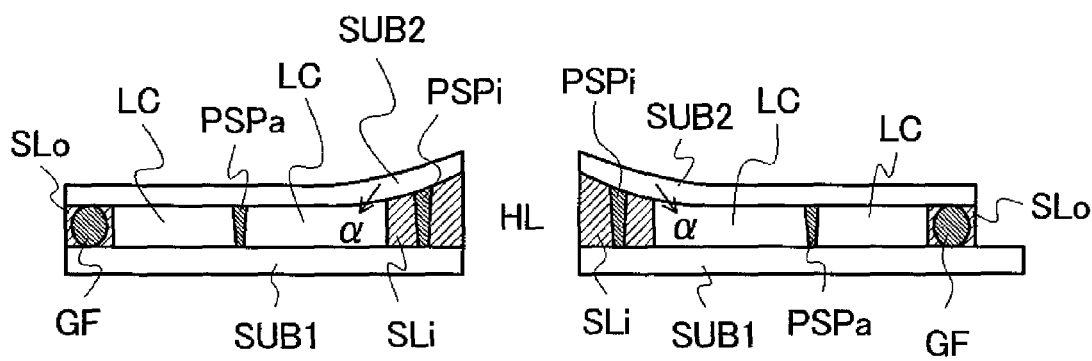
FIG. 6 is a cross sectional view showing the configuration of a liquid crystal display device according to a second embodiment of the invention.

FIG. 6 is a simplified cross sectional view for explaining a second embodiment of the invention, corresponding to FIG. 2B, for example. The configuration in FIG. 6 has a feature in that the height of the columnar spacer PSP (indicated by reference sign PSPi in the drawing) formed in the forming region of the inner sealing material SLi is set larger than the height of the columnar spacer PSP (indicated by reference sign PSPa in the drawing) formed in the display region and the diameter of a glass fiber GF mixed in the outer sealing material SLo. With this configuration, the substrate SUB2 is curved so as to have a larger gap between the substrate SUB2 and the substrate SUB1 as it approaches the opening HL side in, for example, the forming region of the inner sealing material SLi around the opening HL of the substrate SUB2. By the curvature, a force in a direction toward the liquid crystal LC side outside the inner sealing material SLi (arrow α direction in the drawing) is generated in the substrate SUB2.

The reason of the configuration will be described below. The liquid crystal display device is generally set up on a horizontal plane and used. In this case, the liquid crystal LC between the substrates SUB1 and SUB2 tends to accumulate on the upper side of the inner sealing material SLi due to gravity. The liquid crystal LC expands greatly in that accumulated portion at the time of high temperature, which extends the gap between the substrate SUB1 and the substrate SUB2. Therefore, luminance non-uniformity tends to occur in the vicinity of the inner sealing material SLi, deteriorating the quality of display. Therefore, with the above configuration, even when the liquid crystal accumulates and expands in the vicinity of the inner sealing material SLi, the force of the arrow α in the drawing can suppress the extension of the gap between the substrate SUB1 and the substrate SUB2. Accordingly, the deterioration in quality of display can be prevented.

The configuration having the feature shown in the second embodiment can be applied to embodiments shown below.

Third Embodiment

Figure 7:
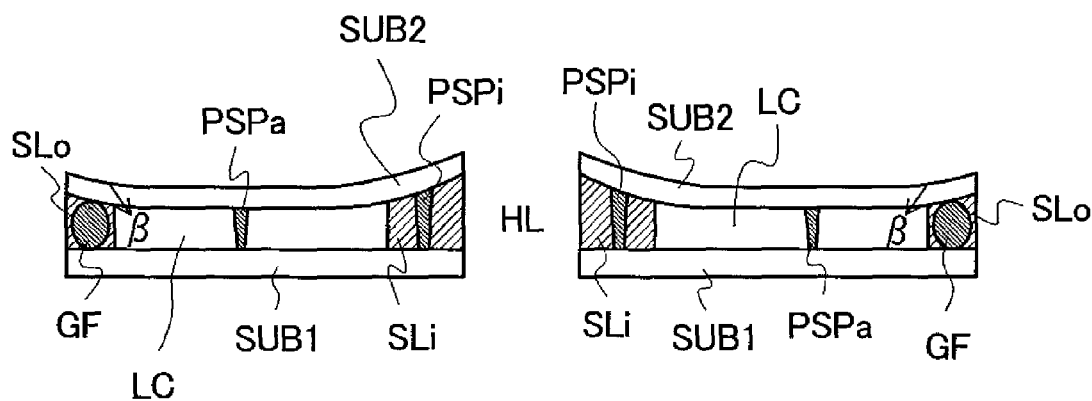
FIG. 7 is a cross sectional view showing the configuration of a liquid crystal display device according to a third embodiment of the invention.

FIG. 7 is a simplified cross sectional view for explaining a third embodiment of the invention, corresponding to FIG. 6. The configuration shown in FIG. 7 is obtained by adding another feature to the configuration shown in FIG. 6. The configuration has a feature in that the diameter of the glass fiber GF mixed in the outer sealing material SLo is set larger than the height of the columnar spacer PSPa formed in the display region. With this configuration, the substrate SUB2 is curved so as to have a larger gap between the substrate SUB2 and the substrate SUB1 as it approaches the outer circumferential side in the forming region of the outer sealing material SLo. By the curvature, a force in a direction toward the liquid crystal LC side inside the outer sealing material SLo (arrow β direction in the drawing) is generated in the substrate SUB2.

The reason of such a configuration resides also in that the liquid crystal display device is set up on a horizontal plane and used. The liquid crystal LC between the substrates SUB1 and SUB2 tends to accumulate in the vicinity of the outer sealing material SLo. The liquid crystal LC expands greatly in that accumulated portion at the time of high temperature, which extends the gap between the substrate SUB1 and the substrate SUB2. Therefore, with the above configuration, even when the liquid crystal accumulates and expands in the vicinity of the outer sealing material SLo, the force of the arrow β in the drawing suppresses the extension of the gap between the substrate SUB1 and the substrate SUB2. Accordingly, the deterioration in quality of display can be prevented also in this case.

The configuration having the feature shown in the third embodiment can be applied to embodiments shown below.

Fourth Embodiment

Figure 8A:
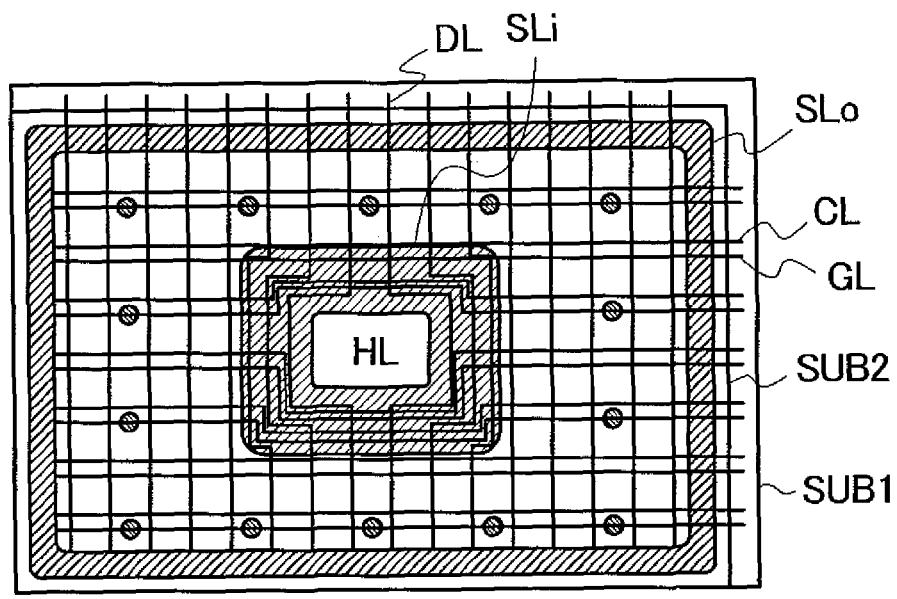
FIGS. 8A and 8B are configuration views showing the configuration of a liquid crystal display device according to a fourth embodiment of the invention.
Figure 8B:
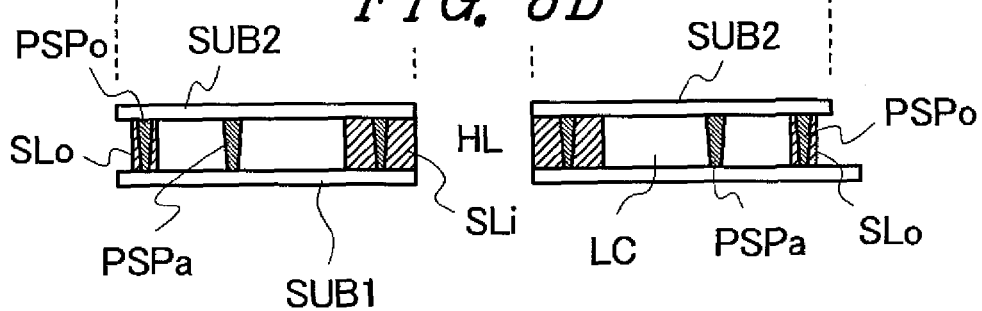
Figure 9A:
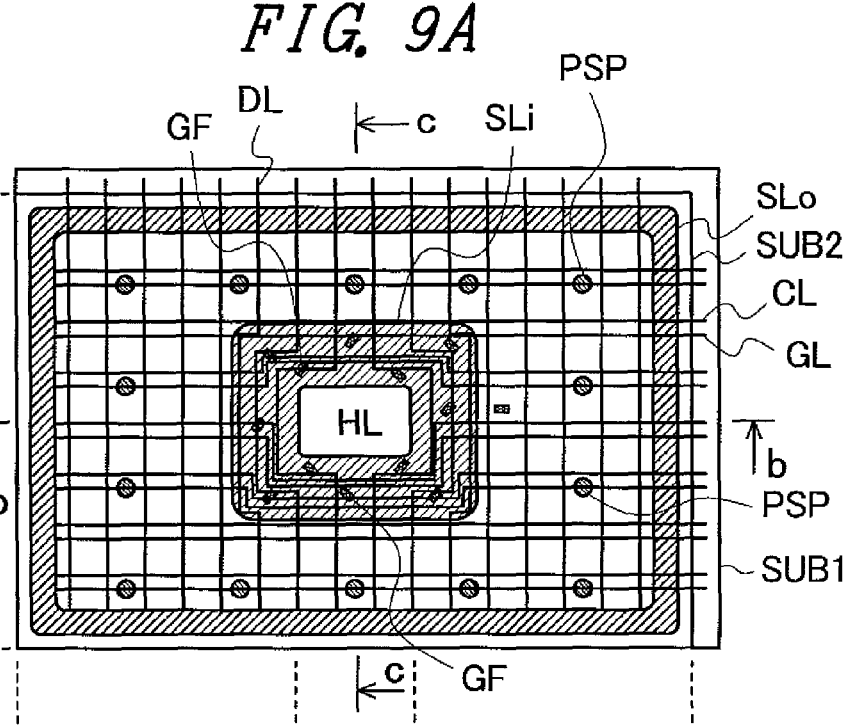
FIGS. 9A to 9C are diagrams for explaining a disadvantage of a conventional liquid crystal display device.
Figure 9C:
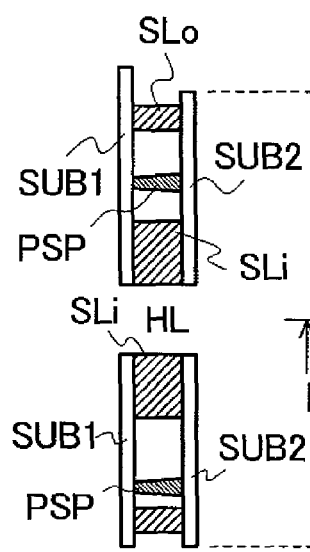
Figure 9B:
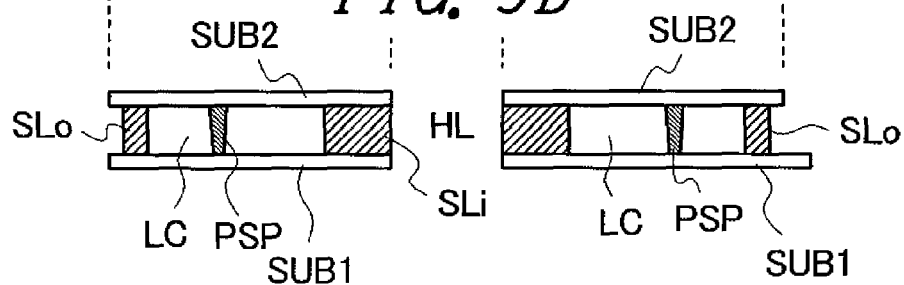
Figure 10A:
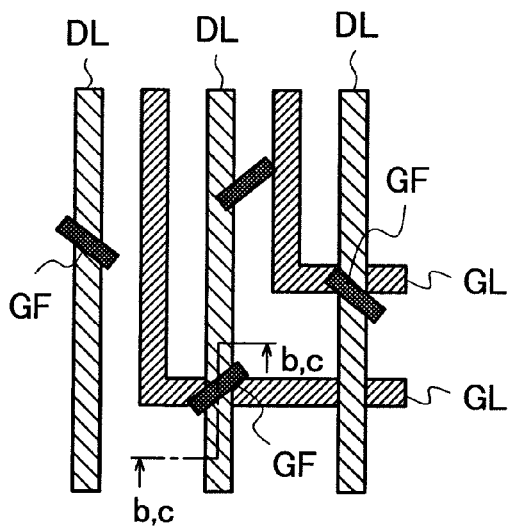
FIGS. 10A to 10C are diagrams for explaining the disadvantage of the conventional liquid crystal display device.
Figure 10B:
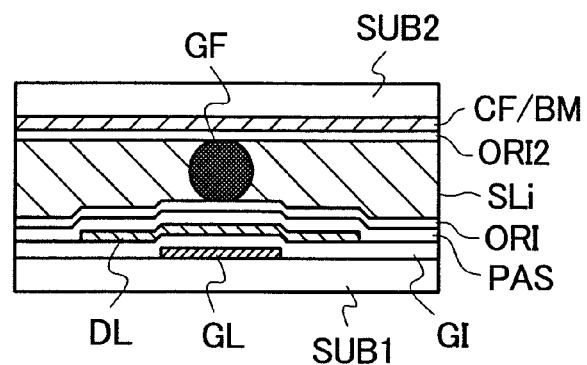
Figure 10C:
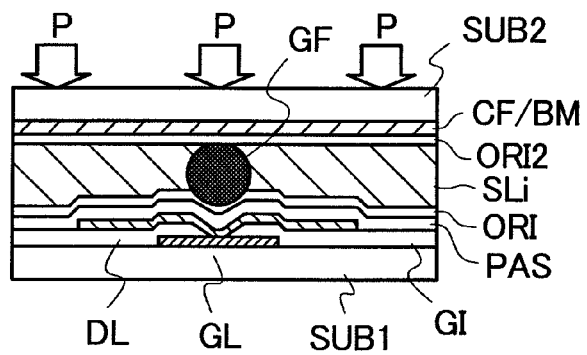

FIGS. 8A and 8B are configuration views for explaining a fourth embodiment of the invention, corresponding to FIGS. 2A and 2B, respectively. The configuration shown in FIGS. 8A and 8B is obtained by partially modifying the configuration shown in the first embodiment. The modified configuration is such that the glass fiber GF mixed in the outer sealing material SLo to function as a spacer is replaced with the columnar spacer PSP (indicated by reference sign PSPo).

In this case, the columnar spacer PSPo can be formed simultaneously with the other columnar spacers, and the height of the columnar spacer PSPo can be freely set without the influence of the heights of the other columnar spacers. This is because, as described above, the height can be set by appropriately setting the diameter of the columnar spacer to an appropriate value.

The configuration having the feature shown in the fourth embodiment can be applied to the embodiments shown above and embodiments shown below.

Fifth Embodiment

The above embodiments have been described in which the common signal lines CL are formed on the surface of the substrate SUB1 on the liquid crystal side. However, the invention can be applied to the case where capacitor signal lines are formed instead of the common signal lines CL. The capacitor signal lines are formed in many cases in a liquid crystal display device employing a vertical electric field method in which a counter electrode is formed on the surface of the substrate SUB2, which faces the substrate SUB1 with the liquid crystal interposed therebetween, on the liquid crystal side. The capacitor signal line is a signal line for forming a capacitor element between the counter electrode and a pixel electrode in each pixel. Such a capacitor element functions to store a video signal supplied to the pixel electrode for a relatively long time in the pixel electrode.

Sixth Embodiment

The above embodiments have been described in which the common signal lines CL or the capacitor signal lines are formed on the surface of the substrate SUB1 on the liquid crystal side. However, the invention can be applied to the case where the common signal lines CL or the capacitor signal lines are not formed. This is because the intersecting portions of the gate signal lines GL and the drain signal lines DL are inevitably formed in the forming region of the inner sealing material SLi in some cases.

Seventh Embodiment

In the above embodiments, beads may be used instead of using the glass fibers GF as spacers. In this case, the gap between the substrate SUB1 and the substrate SUB2 can be controlled by the diameter of the bead.

What is claimed is:

1. A liquid crystal display device comprising:
a pair of substrates disposed to face each other; an inner sealing material surrounding a non-display region between the pair of substrates; an outer sealing material surrounding the inner sealing material; liquid crystal filled between the inner sealing material and the outer sealing material; and a display region formed in a region where the liquid crystal is filled, wherein
at least a plurality of gate signal lines extending in a first direction and arranged in parallel and a plurality of drain signal lines extending in a second direction and arranged in parallel are formed on a surface of one of the pair of substrates on a liquid crystal side, among the plurality of gate signal lines and the plurality of drain signal lines, the gate signal lines and the drain signal lines which are to be arranged so as to cross the non-display region when they are virtually extended as they are are formed into patterns which bypass the non-display region and partially formed in the forming region of the inner sealing material,
first columnar spacers fixed on any one of the pair of substrates are formed in the forming region of the inner sealing material, the first columnar spacers being formed so as to avoid positions overlapped with intersecting portions of the gate signal lines and the drain signal lines,
the first columnar spacers formed in the forming region of the inner sealing material include those which are formed in a region where the gate signal line and the drain signal line are not formed and those which are formed above the gate signal line or the drain signal line, and
the diameters of the first columnar spacers formed in the region where the gate signal line and the drain signal line are not formed are greater than those of the first columnar spacers formed above the gate signal line or the drain signal line.

2. The liquid crystal display device according to claim 1, wherein
second columnar spacers fixed on any one of the pair of substrates are formed in the display region.

3. The liquid crystal display device according to claim 2, wherein
the heights of the first columnar spacers formed in the forming region of the inner sealing material are greater than those of the second columnar spacers formed in the display region.

4. The liquid crystal display device according to claim 2, wherein third columnar spacers fixed on any one of the pair substrates are formed in the forming region of the outer sealing material.

5. The liquid crystal display device according to claim 4, wherein
the heights of the third columnar spacers formed in the forming region of the outer sealing material are greater than those of the second columnar spacers formed in the display region.

6. The liquid crystal display device according to claim 2, wherein
glass fibers or beads are mixed in the outer sealing material.

7. The liquid crystal display device according to claim 6, wherein
the diameters of the glass fibers or the beads mixed in the outer sealing material are greater than the heights of the second columnar spacers formed in the display region.

8. The liquid crystal display device according to claim 1, wherein
common signal lines or capacitor signal lines are each formed between a pair of the gate signal lines adjacent to each other along the gate signal line, among the common signal lines or the capacitor signal lines, the common signal lines or the capacitor signal lines which are to be arranged so as to cross the non-display region when they are virtually extended as they are formed into patterns which bypass the non-display region and partially formed in the forming region of the inner sealing material, and
the first columnar spacers are formed so as to avoid positions overlapped with intersecting portions of the common signal lines or the capacitor signal lines and the drain signal lines.

9. The liquid crystal display device according to claim 8, wherein
the first columnar spacers formed in the forming region of the inner sealing material include those which are formed in a region where the gate signal lines, the drain signal lines, and the common signal lines or the capacitor signal lines are not formed and those which are formed above the gate signal lines, the drain signal lines, and the common signal lines or the capacitor signal lines, and
the diameters of the first columnar spacers formed in the region where the gate signal lines, the drain signal lines, and the common signal lines or the capacitor signal lines are not formed are greater than those of the first columnar spacers formed above the gate signal lines, the drain signal lines, and the common signal lines or the capacitor signal lines.

* * * * *